United States Patent [19]

Matsuura et al.

[11] Patent Number: 4,714,481
[45] Date of Patent: Dec. 22, 1987

[54] GAS SEPARATION MEMBRANE

[75] Inventors: Junichi Matsuura, Kamakura; Munehisa Okada, Machida, both of Japan

[73] Assignee: Mitsubishi Chemical Industries Limited, Tokyo, Japan

[21] Appl. No.: 530,598
[22] PCT Filed: Nov. 30, 1982
[86] PCT No.: PCT/JP82/00454
§ 371 Date: Jul. 20, 1983
§ 102(e) Date: Jul. 20, 1983
[87] PCT Pub. No.: WO83/01905
PCT Pub. Date: Jun. 9, 1983

[30] Foreign Application Priority Data

Nov. 30, 1981 [JP] Japan .................. 56-192373

[51] Int. Cl.$^4$ .................................................. B01D 53/22
[52] U.S. Cl. .............................................. 55/158; 55/16; 55/68; 210/500.27
[58] Field of Search ........................ 55/16, 68, 158; 210/500.2

[56] References Cited

U.S. PATENT DOCUMENTS

| | | | |
|---|---|---|---|
| 3,754,375 | 8/1973 | Bouchilloux et al. | 55/158 X |
| 3,899,309 | 8/1975 | Hoehn et al. | 55/158 X |
| 4,230,463 | 10/1980 | Henis et al. | 55/158 X |
| 4,239,793 | 12/1980 | Matsuura et al. | 55/158 X |
| 4,393,113 | 7/1983 | Sugie et al. | 55/158 X |
| 4,410,338 | 10/1983 | Yamamoto et al. | 55/158 |

FOREIGN PATENT DOCUMENTS

| | | | |
|---|---|---|---|
| 56985 | 5/1979 | Japan | 55/158 |
| 5121 | 1/1981 | Japan | 55/158 |
| 24019 | 3/1981 | Japan | 55/158 |
| 19004 | 2/1982 | Japan | 55/158 |
| 122906 | 7/1982 | Japan | 55/158 |
| 122907 | 7/1982 | Japan | 55/158 |
| 130505 | 8/1982 | Japan | 55/158 |
| 1221404 | 2/1971 | United Kingdom | 55/158 |

*Primary Examiner*—Robert Spitzer
*Attorney, Agent, or Firm*—Oblon, Fisher, Spivak, McClelland, & Maier

[57] ABSTRACT

A gas separation membrane using, as the material for the membrane, a polymer having the main repeating unit of the formula:

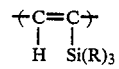

and/or formula:

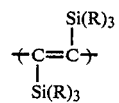

(where R represents alkyl group, vinyl group, allyl group, cycloalkyl group, aryl group, benzyl group or hydrogen atom, each R being possibly identical or different to each other) and having the number average molecular weight of between 1,000–1,000,000, or a partially or wholly hydrogenated product of said polymer with the unsaturation bonds therein.

6 Claims, 2 Drawing Figures

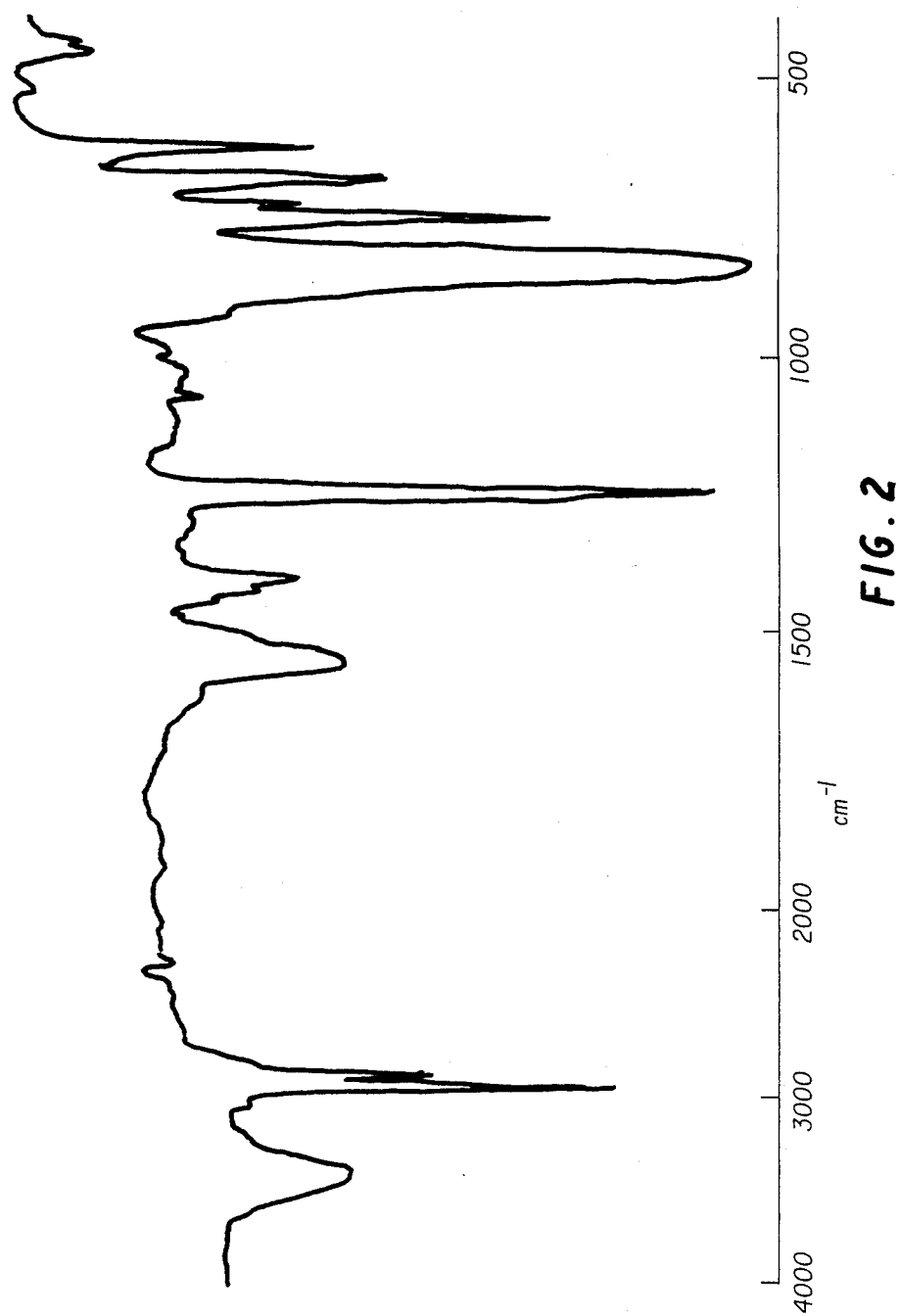

GAS SEPARATION MEMBRANE

TECHNICAL FIELD

This invention concerns a gas separation membrane using an organic silicon polymer as the material for the membrane.

BACKGROUND ART

A high separation factor and a high permeation rate to gases are required for a gas separation membrane.

For satisfying such a performance, a structure may be considered in which a membrane layer substantially contributing to the separating function is provided at a thickness as thin as possible and supported on a porous layer.

Various methods have been devised for the process of producing membranes of such a structure.

There can be mentioned, for instance, a method of overlaying thin films on a porous layer which are prepared separately to each other, a method of forming an anisotropic membrane at once in which a surface layer and a porous layer are present together and a method of forming a thin film by carrying out in situ polymerization, on a porous layer, from a monomer by way of various processes or a method of forming a thin film by coating a solution of polymer and then evaporating a solvent.

Silicon-containing polymers are generally known as the material having the highest gas permeability coefficient (value represented by the volume of a gas in cm$^3$ which permeates through a film of 1 cm thickness, at the film area 1 cm$^2$ for one second with the pressure difference of 1 cmHg), and polysiloxane, block copolymers of polysiloxane with polycarbonate, styrene, phenolic resin or the like, and polyvinyltrimethylsilane have, for example, been employed as the material for the gas separation membrane.

Among these silicon-polymers, although polysiloxane is the material having the highest permeability coefficient, its possible thickness when formed into a thin film is restricted due to the low strength thereof. Materials improved with the defect in a strength include, for example, polysiloxane-polycarbonate copolymer, polysiloxane-styrene copolymer and polysiloxane-phenolic resin copolymer and they are formed into a thin film and overlayed with a porous film prepared separately for use. Further, polyvinyltrimethylsilane can be formed into an anisotropic membrane of a thin film thickness and a dense structure and used, as the gas separation membrane.

The membrane material of a polymer having the main repeating unit of the formula

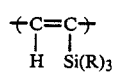

and/or formula

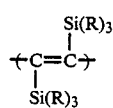

is a polymer having carbon-carbon bonds in the main chain and silicon atoms on the side chain of the polymer in the same manner as in polyvinyltrimethylsilane having the repeating unit of the formula

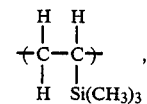

and the similar separating function has been anticipated. As the result of the study, we have however found that a characteristically excellent separating function can be obtained as compared with polyvinyltrimethylsilane and have accomplished the present invention.

DISCLOSURE OF INVENTION

The gist of the present invention concerns a gas separation membrane using, as the membrane material, a polymer having the main repeating unit of the formula

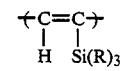

and/or the formula

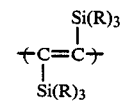

(wherein R represents alkyl group, vinyl group, allyl group, cycloalkyl group, aryl group, benzyl group or hydrogen atom, each R being possibly identical or different to each other) and having a number average molecular weight of between 1,000–1,000,000 and preferably 2,000–100,000, or a partially or wholly hydrogenated product of the polymer with respect to the unsaturated bonds therein.

The polymer mainly comprising the repeating unit of the formula

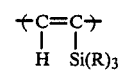

and/or the formula

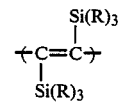

can be obtained by polymerizing a triorganoethynylsilane of the formula

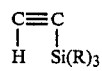

and/or a bistriorganosilylacetylene of the formula

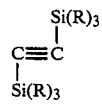

as the main starting material. The polymer and hydrogenated product thereof excepting polytriorganosilane are novel silicone polymers and we have found that they are best suited as the material for the gas separation membrane having excellent gas permeating function and excellent separating function between gases and have attained the present invention.

BRIEF DESCRIPTION OF DRAWINGS

FIGS. 1 and 2 are infrared absorption spectrum charts for one example of the polymer used as the membrane material in the present invention.

BEST MODE FOR CARRYING OUT THE INVENTION

Figure 1:
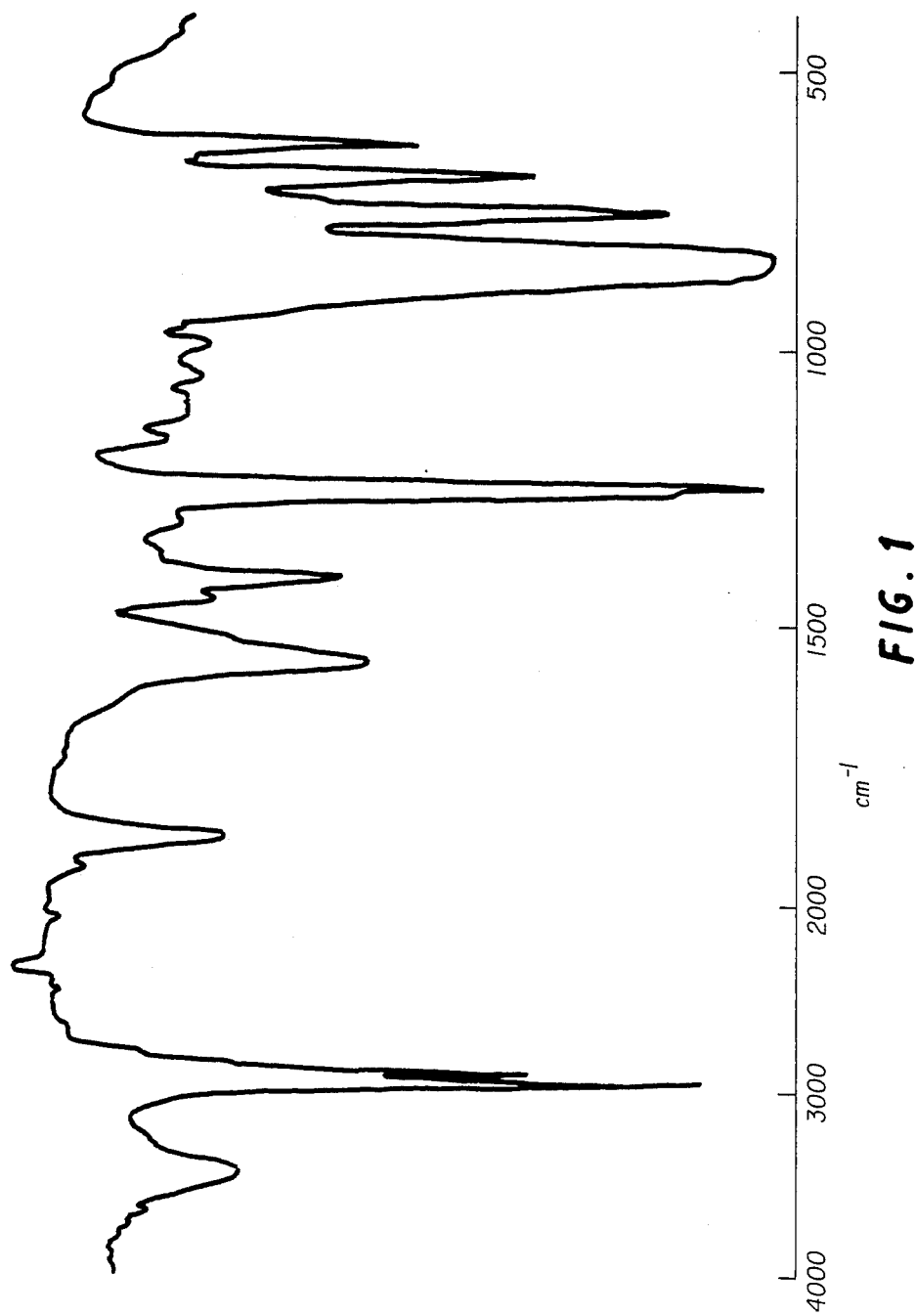

The present invention will now be explained more in detail.

The polymer used as the material for the gas separation membrane according to the present invention can be produced by polymerizing or copolymerizing a triorganoethynylsilane having the formula

and/or a bistriorganosilylacetylene of the formula

(wherein R has the same meanings as R in the previous formula).

Examples of monomers represented by the formula

include, for example, trimethylethynylsilane, triethylethynylsilane, tri-n-propylethynylsilane, tri-i-propylethynylsilane, tri-n-butylethynylsilane, tri-i-butylethynylsilane, dimethylethylethynylsilane, methyldiethylethynylsilane, dimethyl-n-propylethynylsilane, methylethyl-n-propylethynylsilane, tri-n-hexylethynylsilane, dimethylvinylethynylsilane, dimethylallylethynylsilane, diethylvinylethynylsilane, diethylallylethynylsilane, methyldiallylethynylsilane, triallylethynylsilane, di-n-propylallylethynylsilane, triphenylethynylsilane, diphenylmethylethynylsilane, diphenylethylethynylsilane, diphenyl-n-propylethynylsilane, dimethylphenylethynylsilane, diethylphenylethynylsilane, di-n-propylphenylethynylsilane, tricyclohexylethynylsilane, dimethylcyclohexylethynylsilane, diphenylcyclohexylethynylsilane, dimethylhydroethynylsilane and tribenzylethynylsilane.

Further, examples of monomers represented by the formula

include, for example, bis(trimethylsilyl)acetylene, bis(triethylsilyl)acetylene, bis(tri-n-propylsilyl)acetylene, bis(tri-n-butylsilyl)acetylene, bis(tri-i-propylsilyl)acetylene, bis(tri-i-butylsilyl)acetylene, bis(triphenylsilyl)acetylene, bis(tricyclohexylsilyl)acetylene, bis(tribenzylsilyl)acetylene, bis(dimethylphenylsilyl)acetylene and bis(diphenylmethylsilyl) acetylene.

Among these monomers, those in which R in the above mentioned formula is an alkyl group or a phenyl group are particularly preferred. Polymerization for these monomers, triorganoethynylsilane and bistriorganosilylacetylene are carried out according to the polymerizing process for various acetylene derivatives as described in Japanese Patent Publication Nos. 37312/1976, 20511/1977, 30722/1980, 43037/1979 and 23565/1980. Specifically, tungsten hexachloride or molybdenum pentachloride is used as a main catalyst and a tin compound such as tetraphenyltin, alcohols, ketones and ethers are used together as a second ingredient. The ratio of the main catalyst and the second ingredient is preferably between 0.01-10 in the molar ratio of the second ingredient/main catalyst. The ratio of the monomer to the main catalyst is in a range of less than 1,000. The solvent usable in the reaction includes aromatic hydrocarbon such as benzene and toluene and halogenated hydrocarbon such as ethylenedichloride and carbon tetrachloride. Further, the reaction temperature for the polymerization is preferably between $-10°-50°$ C. The reaction time, although different depending on the reaction conditions, is usually selected between 0.1–100 hours. After the completion of the polymerizing reaction, the reaction product can be collected, for example, by pouring it into methanol and depositing the resultant polymer. Although the polymerizing process has been exemplified as above, it is not restricted to these processes. Copolymerization with other acetylene derivatives not containing silicon is also possible.

In addition to the polymer obtained through polymerization of copolymerization of the triorganoethynylsilane represented by the formula

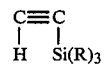

and/or the bistriorganosilylacetylene represented by the formula

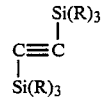

as the main starting material, hydrogenated product of the polymer obtained through the polymerization or copolymerization can also be used as the material for the gas separation membrane according to this invention. In the hydrogenation, a portion or substantially the whole portion, that is, a ratio of from 0 to 100%, preferably, from 0 to 80% of the unsaturated bonds present in the polymer can be reacted and all of these hydrogenated products can be used as the material for the gas separation membrane according to this invention.

For the hydrogenation, means conventionally employed for the catalytic hydrogenating treatment can be used. Specifically, nickel catalyst (for instance, Raney nickel), cobalt, platinum, palladium, ruthenium, rhodium catalyst, a mixture thereof or an alloy catalyst can be used as the hydrogenating catalyst. These catalyst can be used solely, as solid or uniform soluble complex, or in the form supported on carbon, silica, alumina or diatomaceous earth. Furthermore, hydrogenation may also be conducted by using a metal complex obtained by reducing a compound containing nickel, titanium, cobalt or the like with an organic metal compound (for example, trialkylaluminum and alkyllithium). Hydrogen usable herein is usually molecular hydrogen but hydrogen-containing gases can also be used so long as they do not contain substances acting as a catalyst poison. The hydrogen pressure may be that of an ambient pressure flow or of a pressurized system. The temperature is from room temperature to 200° C. and, preferably, of less than 180° C.

The organic silicon polymer obtained in this way is then formed into a film, in which film forming method has no particular restriction.

Preferred film forming methods include a method of applying a coating on a porous film prepared separately, and a method of forming an anisotropic film comprising a dense surface layer and a porous layer.

In the method of applying a coating on a porous membrane, the organic silicon polymer is dissolved in an organic solvent, a porous membrane composed of a different material formed separately into a film is immersed in the solution and, thereafter, the organic solvent is dried.

The organic solvent used for dissolving the polymer into a film-forming solution has no particular restriction so long as it is a solvent capable of dissolving the polymer, having a low boiling point thus being removed with relatively ease and not dissolving the porous membrane as the support.

For instance, benzene, toluene, pentane, hexane, heptane and tetrahydrofuran can be mentioned while depending on the kind of material for the porous membrane.

The porous membrane for use in the present invention involves such a membrane as having a sponge-like structure and including pores opened to both surfaces thereof, or such a membrane having a dense layer on one surface of the membrane and opened pores at the other surface, or a membrane having ultrafine micropores in the molecular point of view, with the permeation rate for the nitrogen gas of more than $1 \times 10^{-4}$ $cm^3/cm^2 \cdot sec \cdot cmHg$ in the permeation volume per unit membrane area ( $1 cm^2$) for unit time (1 sec) with unit pressure difference (1 cmHg).

Such a membrane can be prepared by various methods for example, by adding an organic solvent or an additive to the material for the porous membrane to form a film and, thereafter, leaching out the organic solvent or the additive.

The kind of the materials for the porous membrane has no particular restriction and it includes, for example, polypropylene, polyvinyl chloride, polystyrene, polyvinyl alcohol, polymethyl methacrylate, polyacrylonitrile, polycarbonate, polyphenyleneoxide, polyamide, polysulfone, polyethersulfone, polysulfoneamide, polypiperazine, cellulose acetate, cellulose acetate butyrate, polytetrafluoroethylene (Teflon), vinylidene fluoride, polyvinyltrimethylsilane and those polymers containing polyaminoacid structure.

Further, inorganic materials such as glass can also be used.

The concentration of the solution in the case of dissolving the organic silicon polymer into the organic solvent for covering on the porous membrane is between 0.1-50% by weight and, preferably, between 1-10% by weight, while different depending on the molecular weight of the polymer, molecular weight distribution and the kind of the solvent.

If the concentration is lower than 0.1% by weight, the thickness of the coating film becomes thinner as well, whereby no sufficient separating function can be obtained although the gas permeation rate is higher. On the other hand, if the concentration is higher than 50% by weight, the thickness of the coating membrane is increased to decrease the gas permeation rate although the separating performance can be achieved.

The coating amount of the polymer is usually selected within such a range as providing 0.01-10 mg per 1 $cm^2$ area of the porous membrane.

The thickness of the porous membrane is preferably, between $10\mu-100\mu$ although it is not particularly restricted.

The method of coating the organic silicon polymer on the porous membrane has no particular restriction and it can be carried out by the method of immersing the porous membrane into the polymer solution or by a method of casting the polymer solution on the surface of the porous membrane.

In either case of applying the coating on the porous membrane or forming the film by other method;

(1) the membrane can be used in any of the configurations such as fiberous form, tubular form, spiral form and plateous form (the configuration of the porous membrane may be selected in the case of applying the coating on the porous membrane), (2) heat treatment may further be applied to the membrane after the film formation, (3) the coating layer is further laminated by way of plasma polymerization, etc on the surface of the membrane according to the present invention, and (4) the permeation velocity can be improved by mixing or bonding a polymer having polysiloxane couplings to the organic silicon polymer as the material for the membrane.

The content of the present invention will now be explained by way of examples but the contents of the present invention are not restricted only to such examples.

EXAMPLE 1

Synthesis for polytrimethylethynylsilane

To a 200 ml flask, were charged 100 ml of dewatered toluene, 9.8 g (0.1 mol) of trimethylethynylsilane as the monomer, and each 3 mmol of tungsten hexachloride and tetraphenyltin as the catalyst, and they were reacted at 15°-35° C. for 100 hours. After the reaction was over, methanol was added by about 10 times of volume to the reaction solution to precipitate the resultant polymer, followed by repeating filtration and methanol washing to obtain 4.5 g of product after drying.

Measurement was carried out by gel permeation chromatography (hereinafter referred to simply as GPC) for the portion of the product soluble to tetrahydrofuran.

The GPC measurement was carried out under the conditions: at 5000H, 4000H, 3000H, 2000H of an RI-8 type detector column TSK-G, manufactured by Toyo Soda, using tetrahydrofuran as the solvent, flowing rate of 1 ml/min, at 45° C., and with a monodispersed polystyrene manufactured from Pressure Chemical (USA), and all of the values were converted as polystyrene.

As the result of the GPC measurement for the product, the number average molecular weight and the weight average molecular weight converted as polystyrene were 5,000 and 21,600 respectively, with Mw/Mn being 4.33.

The result of the infrared spectrum measurement for the product is shown in FIG. 2. Absorption of the carbon-carbon conjugated double bond was observed at 1,570 cm$^{-1}$.

The product is a polymer having repeating unit of the formula

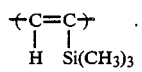

EXAMPLE 2

Synthesis for polytrimethylethynylsilane

The same reaction and after-treatments as in Example 1 were carried out excepting the use of molybdenum pentachloride and tetraphenyltin as the catalyst to obtain 1.2 g of product.

EXAMPLE 3

Synthesis for polybis(trimethylsilyl)acetylene

To a 200 ml flask, were charged 100 ml of dewatered toluene, 8.5 g (0.05 mol) of bis(trimethylsilyl)acetylene as the monomer and each 1.5 mmol of molybdenum pentachloride and tetraphenyltin as the catalyst, and they were reacted at 15°–35° C. for 100 hours to obtain 0.3 g of product. Based on the infrared absorption spectroscopy, the product was assumed to have the repeating unit of the formula

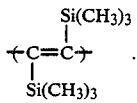

EXAMPLE 4

Synthesis for polytrimethylethynylsilane

To a 2 liter flask, were charged 1.5 liter of toluene, 147 g (1.5 mol) of trimethylethynylsilane as the monomer and each 30 mmol of tungsten hexachloride and tetraphenyltin as the catalyst, and they were reacted at 23°–25° C. for 24 hours. After the reaction was over, the reaction solution was poured into methanol of about twice volume to precipitate the resultant polymer, followed by repeating filtration and methanol washing to obtain 67 g of product after drying.

As the result of the same GPC measurement as in Example 1 for the portion of the product soluble to tetrahydrofuran, the number average molecular weight (Mn) and the weight average molecular weight (Mw) converted as styrene were 3,700 and 6,200 respectively, with Mw/Mn being 1.7.

EXAMPLE 5

Synthesis for the copolymer of trimethylethynylsilane and bis(trimethylsilyl)acetylene The same reaction and after-treatments as in Example 1 were carried out excepting the use of 2 mmol of tungsten hexachloride and tetraphenyltin as the catalyst, 50 ml of toluene as the solvent, 5.0 g of trimethylethynylsilane and 5.0 g of bis(trimethylsilyl)acetylene as the monomer to obtain 1.81 g of solid polymer.

EXAMPLE 6

Synthesis for the copolymer of trimethylethynylsilane and bis(trimethylsilyl)acetylene The same reaction and after-treatments as in Example 5 were carried out excepting the use of 7.5 g of trimethylethynylsilane and 2.5 g of bis(trimethylsilyl) acetylene as the monomer to obtain 3.84 g of solid polymer.

EXAMPLE 7

Hydrogenating reaction for polytrimethylethynylsilane

To a 200 ml of autoclave, were charged 1.6 g of polytrimethylethynylsilane obtained in Example 1, 0.8 g of ruthenium catalyst supported on carbon, 66.2 g of normal heptane and 3.8 g of isopropanol, and they were reacted at 150° C. and under a hydrogen pressure of 35 kg/cm$^2$G for one hour. After the reaction was over, the catalyst was eliminated by filtration and the solvent was removed from the filtrate through evaporation to obtain a hydrogenation product. In the infrared absorption spectrum for the product, decrease in the absorption for the double-bond was observed near 1,570 cm$^{-1}$ (refer to FIG. 1. Decrease in the absorption at 1,570 cm$^{-1}$ was judged based on the absorbing intensity at 1,250 cm$^{-1}$ or 1,410 cm$^{-1}$). GPC measurement was carried out under the same conditions as in Example 1 and the thus obtained number average molecular weight and the weight average molecular weight converted as polystyrene were 6,400 and 15,300 respectively, with Mw/Mn being 2.4.

EXAMPLE 8

Hydrogenating reaction for polytrimethylethynylsilane 2.0 g of polytrimethylethynylsilane obtained in Example 4, 1.0 g of RhCl(P$\phi_3$)$_3$ catalyst, 45 ml of normal hexane and 5 ml of isopropanol were charged, and they were reacted at 150° C. under the hydrogen pressure of 74 kg/cm$^2$G for 5 hours. After the reaction was over, solid substances were removed through filtration and the filtrate was added into methanol of about 10 times volume to precipitate a polymer. The hydrogenating rate calculated due to the decrease in the absorption of the double bond near 1,570 cm$^{-1}$ for the infrared absorption spectrum of the product was 42%. Mn was 4,600 and Mw was 7,300, with Mw/Mn being 1.6.

EXAMPLE 9

Hydrogenating reaction for polytrimethylethynylsilane

The same reaction as in Example 8 was carried out excepting the use of toluene instead of normal hexane as the solvent to obtain a product with 40% hydrogenating rate calculated due to the decrease in the absorption of double bond near 1,570 cm$^{-1}$ in the infrared spectrum.

EXAMPLE 10

Measurement for the gas permeating performance of polytrimethylethynylsilane

Polytrimethylethynylsilane obatained in Example 1 was dissolved into toluene to prepare a 5% by weight solution.

Commercially available millipore filter, trade name, VSWP (average pore size of 0.025μ) was immersed in this solution for 2 min and then dried in air to eliminate the solvent.

The membrane was installed in a permeation test device for measuring the permeation rate for various type of gases.

The surface area of the membrane was 12.56 cm$^2$, each of high purity gases was taken out from a gas bomb and brought to contact with the high pressure side of the membrane under a control pressure of 2 atm., the permeated gas was collected on the opposite side of the membrane under the atmospheric pressure and a permeation amount was measured in a gas burette with elapse of time. The temperature of the gas and the device was 23°–25° C.

The permeation velocity for each type of the gases was represented by converting the volume (cc) of each gas permeating per unit area (1 cm$^2$), per unit pressure difference (1 cmHg) and per unit time (1 sec) into the normal state.

The separating factor was represented by the ratio of the permeation rate between each type of gases.

| | Permeation rate | |
|---|---|---|
| $N_2$ | $2.64 \times 10^{-7}$ | CC(STP)/cm$^2$ · sec · cmHg |
| $O_2$ | $1.06 \times 10^{-6}$ | CC(STP)/cm$^2$ · sec · cmHg |
| $CO_2$ | $2.80 \times 10^{-6}$ | CC(STP)/cm$^2$ · sec · cmHg |
| $H_2$ | $9.24 \times 10^{-6}$ | CC(STP)/cm$^2$ · sec · cmHg |
| Separating factor (ratio between the permeation rate) | | |
| $O_2/N_2$ | 4.0 | |
| $CO_2/N_2$ | 10.6 | |
| $H_2/N_2$ | 35.0 | |
| $CO_2/O_2$ | 2.6 | |
| $H_2/O_2$ | 8.7 | |
| $H_2/CO_2$ | 3.3 | |

EXAMPLE 11

Measurement for the gas permeating performance of the copolymer of trimethylethynylsilane and bis(trimethylsilyl) acetylene Membrane was prepared in the same manner as in Example 10 excepting by dissolving the copolymer of trimethylethynylsilane and bis(trimethylsilyl)acetylene obtained in Example 5 into about 2% toluene solution and the permeation rate was measured for each kind of gases. Further, separating factor was represented by the ratio thereof.

| | Permeation rate | |
|---|---|---|
| $N_2$ | $7.6 \times 10^{-7}$ | CC(STP)/cm$^2$ · sec · cmHg |
| $O_2$ | $2.7 \times 10^{-6}$ | CC(STP)/cm$^2$ · sec · cmHg |
| $CO_2$ | $1.0 \times 10^{-5}$ | CC(STP)/cm$^2$ · sec · cmHg |
| $H_2$ | $1.7 \times 10^{-5}$ | CC(STP)/cm$^2$ · sec · cmHg |
| separating factor (ratio between the permeation rate) | | |
| $O_2/N_2$ | 3.6 | |
| $CO_2/N_2$ | 13.2 | |
| $H_2/N_2$ | 22.4 | |
| $CO_2/O_2$ | 3.7 | |
| $H_2/O_2$ | 6.3 | |
| $H_2/CO_2$ | 1.7 | |

EXAMPLE 12

Measurement for the gas permeating performance of hydrogenated product of polytrimethylethynylsilane Hydrogenated product of polytrimethylethynylsilane obtained in Example 7 was dissolved in toluene to prepare a 5% by weight of solution.

A commercially available millipore filter, trade name, VSWP (average pore size of 0.025μ) was immersed in this solution for 2 min and then dried in air to eliminate the solvent.

The membrane was installed in a permeation test device and permeation rate for each kind of gases was measured in the same manner as in Example 10.

| | Permeation rate | |
|---|---|---|
| $N_2$ | $6.49 \times 10^{-7}$ | CC(STP)/cm$^2$ · sec · cmHg |
| $O_2$ | $2.72 \times 10^{-6}$ | CC(STP)/cm$^2$ · sec · cmHg |
| $CO_2$ | $1.21 \times 10^{-5}$ | CC(STP)/cm$^2$ · sec · cmHg |
| $H_2$ | $1.93 \times 10^{-5}$ | CC(STP)/cm$^2$ · sec · cmHg |
| Separating factor (ratio between the permeation rate) | | |
| $O_2/N_2$ | 4.2 | |
| $CO_2/N_2$ | 18.6 | |
| $H_2/N_2$ | 29.7 | |
| $CO_2/O_2$ | 4.4 | |
| $H_2/O_2$ | 7.1 | |
| $H_2/CO_2$ | 1.6 | |

By the way, the separating factor of polyvinyltrimethylsilane described in the Examples 3 and 4 of Japanese Patent Laid-Open No. 2093/1971 when calculated based on the permeation rate thereof is as below:

Polytrimethylvinylsilane (Reference Example)

| Separating factor (ratio between the permeation rate) | |
|---|---|
| $O_2/N_2$ | 3.8 |
| $CO_2/N_2$ | 6.7 |
| $H_2/N_2$ | 19.1 |
| $CO_2/O_2$ | 2.1 |
| $H_2/O_2$ | 5.0 |

It is supposed that the separating factor of the gas separation membrane as described in Examples 10, 11 and 12 of the present invention has superior features as compared with that of the polyvinyltrimethylasilane membrane.

EXAMPLE 13

Measurement for the gas permeating performance of polytrimethylethynylsilane

The same film formation and the measurement for the permeation velocity as in Example 6 were carried out excepting that immersion was conducted for one min in a 5% toluene solution of polytrimethylethynylsilane obtained in Example 4.

| | Permeation rate | |
|---|---|---|
| $N_2$ | $1.01 \times 10^{-6}$ | CC(STP)/cm$^2$ · sec · cmHg |
| $O_2$ | $4.02 \times 10^{-6}$ | CC(STP)/cm$^2$ · sec · cmHg |
| $CO_2$ | $1.21 \times 10^{-5}$ | CC(STP)/cm$^2$ · sec · cmHg |
| $H_2$ | $2.42 \times 10^{-5}$ | CC(STP)/cm$^2$ · sec · cmHg |
| Separating factor (ratio between the permeation rate) | | |
| $O_2/N_2$ | 4.0 | |
| $CO_2/N_2$ | 12.0 | |
| $H_2/N_2$ | 24.0 | |
| $CO_2/O_2$ | 3.0 | |
| $H_2/O_2$ | 6.0 | |
| $H_2/CO_2$ | 2.0 | |

EXAMPLE 14

Measurement for the gas permeating performance of polytrimethylethynylsilane

The same film formatiom was carryed out as in Example 13 excepting that 0.25 g of the hydrogenated product of polytrimethylethynylsilane obtained in Example 8 were dissolved in 5 g of toluene, and the permeation rate for various kind of gases was measured. The separating factor was represented by the ratio thereof.

| | Permeation rate | |
|---|---|---|
| $N_2$ | $4.7 \times 10^{-7}$ | $CC(STP)/cm^2 \cdot sec \cdot cmHg$ |
| $O_2$ | $2.1 \times 10^{-6}$ | $CC(STP)/cm^2 \cdot sec \cdot cmHg$ |
| $CO_2$ | $6.9 \times 10^{-6}$ | $CC(STP)/cm^2 \cdot sec \cdot cmHg$ |
| $H_2$ | $1.2 \times 10^{-5}$ | $CC(STP)/cm^2 \cdot sec \cdot cmHg$ |
| Separating factor (ratio between the permeation rate) | | |
| $O_2/N_2$ | 4.4 | |
| $CO_2/N_2$ | 14.7 | |
| $H_2/N_2$ | 25.5 | |
| $CO_2/O_2$ | 3.3 | |
| $H_2/O_2$ | 5.7 | |
| $H_2/CO_2$ | 1.7 | |

EXAMPLE 15

Synthesis example for a copolymer of trimethylethynylsilane and other acetylene derivative The same reaction as in Example 4 was carried out excepting the use of 131 g of trimethylethynylsilane as the monomer and 17.4 g of 2-octyne as other acetylene compound to obtain 70 g of product.

EXAMPLE 16

Hydrogenating reaction for a copolymer of polytrimethylethynylsilane and 2-octyne 50 g of the copolymer of polytrimethylethynylsilane-2-octyne obtained in Example 15, 50 g of ruthenium catalyst supported on carbon, 1.5 liter of toluene and 75 ml of isobutanol were charged in a 2 liter volume reactor, and they were reacted at 170° C., under the hydrogen pressure of 74 kg/cm²G for 5 hours. After the reaction was over, the catalyst was removed through filtration and the solvent was eliminated from the filtrate by way of evaporation to obtain 17 g of hydrogenation product. The hydrogenating rate calculated due to the decrease in the absorption on double bond near 1,570 cm$^{-1}$ in the infrared absorption spectrum for the product was 36%. Mn was 7,300 and Mw was 63,300, with Mw/Mn being 8.7.

EXAMPLE 17

Measurement for the gas permeating performance of the hydrogenation product of polytrimethylethynylsilane and 2-octyne copolymer Membrane formation was carried out in the same manner as in Example 10 excepting that 0.16 g of the hydrogenation product of the copolymer of polytrimethylethynylsilane and 2-octyne obtained in Example 16 were dissolved in 5 g of toluene and the permeation rate for each kind of gases was measured. The separating factor was represented as the ratio thereof.

| | Permeation rate | |
|---|---|---|
| $N_2$ | $2.5 \times 10^{-6}$ | $CC(STP)/cm^2 \cdot sec \cdot cmHg$ |
| $O_2$ | $1.0 \times 10^{-5}$ | $CC(STP)/cm^2 \cdot sec \cdot cmHg$ |
| $CO_2$ | $3.6 \times 10^{-5}$ | $CC(STP)/cm^2 \cdot sec \cdot cmHg$ |
| $H_2$ | $6.6 \times 10^{-5}$ | $CC(STP)/cm^2 \cdot sec \cdot cmHg$ |
| Separating factor (ratio between the permeation rate) | | |
| $O_2/N_2$ | 4.0 | |
| $CO_2/N_2$ | 14.4 | |
| $H_2/N_2$ | 26.4 | |
| $CO_2/O_2$ | 3.6 | |
| $H_2/O_2$ | 6.6 | |
| $H_2/CO_2$ | 1.8 | |

INDUSTRIAL APPLICABILITY

The membrane according to the present invention can be employed for separating a gas mixture, particularly, containing at least one of the gases of oxygen, nitrogen, gaseous carbon dioxide, carbon monoxide, hydrogen, helium, methane and argon from each other.

For instance, it can be applied to the separation between nitrogen and oxygen in the production of oxygen-enriched air, separation between methane and helium in the recovery of helium from natural gases, separation between argon and hydrogen, methane and hydrogen and nitrogen and hydrogen in the recovery of hydrogen from hydrogenating reaction exhaust gases, separation between carbon monooxide and hydrogen in the recovery of hydrogen from cracking gases, separation between carbon dioxide and nitrogen in the recover of carbon dioxide from combustion gases.

We claim:

1. A gas separation membrane, comprising:
a membrane of a polymer having as its main repeating units, a unit of the formula:

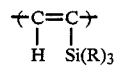

and/or the formula

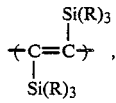

wherein R is an alkyl group, a vinyl group, an allyl group, a cycloalkyl group, an aryl group, a benzyl group or a hydrogen atom, with the R groups independently being identical or different, said polymer having a number average molecular weight of between 1,000–1,000,000, or a polymer having up to 80% of its unsaturated bonds hydrogenated.

2. The gas separation membrane of claim 1, wherein the material for said membrane composed of said polymer or said partially hydrogenated product of said polymer is coated onto a porous membrane.

3. The gas separation membrane of claim 2, wherein said porous membrane has a nitrogen gas permeation rate of greater than $1 \times 10^{-4}$ cm$^3$/cm$^2$·sec· cm Hg.

4. The gas separation membrane of claim 2, wherein said porous membrane is a material selected from the group consisting of polypropylene, polyvinylchloride, ,polystyrene, polyvinyl alcohol, polymethylmethacrylate, polyacrylonitrile, polycarbonate, polyphenyleneoxide, polyamide, polysulfone, polyethersulfone, polysulfoneamide, polypiperazine, cellulose acetate, cellulose acetate butyrate, polytetrafluoroethylene, vinylidene fluoride, and polyvinyltrimethylsilane.

5. The gas separation membrane of claim 2, wherein the amount of said silicon containing polymer coated on said porous membrane to form said gas separation membrane ranges from 0.01–10 mg per 1 cm$^2$ of the porous membrane.

6. The gas separation membrane of claim 2, wherein the thickness of said porous membrane ranges from 10μ–100 μ.

* * * * *